(12) United States Patent
Zhang et al.

(10) Patent No.: US 12,184,171 B2
(45) Date of Patent: Dec. 31, 2024

(54) CHARGE PUMP WITH IMPROVED LIGHT-LOAD EFFICIENCY AND CONTROL METHOD THEREOF

(71) Applicant: Chengdu Monolithic Power Systems Co., Ltd., Chengdu (CN)

(72) Inventors: Zhenya Zhang, Hangzhou (CN); Lei Du, Hangzhou (CN); Rui Wang, Chengdu (CN); Shanglin Xu, Chengdu (CN); Yueying Du, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 61 days.

(21) Appl. No.: 18/309,451

(22) Filed: Apr. 28, 2023

(65) Prior Publication Data
US 2023/0261569 A1    Aug. 17, 2023

(30) Foreign Application Priority Data
May 5, 2022   (CN) .......................... 202210481003.6

(51) Int. Cl.
*H02M 3/07* (2006.01)
*H02M 1/00* (2006.01)
*H02M 1/088* (2006.01)

(52) U.S. Cl.
CPC .......... *H02M 3/07* (2013.01); *H02M 1/0012* (2021.05); *H02M 1/088* (2013.01)

(58) Field of Classification Search
CPC ....................................................... H02M 3/07

USPC ........................................................... 327/536
See application file for complete search history.

(56) References Cited

U.S. PATENT DOCUMENTS

| | | | | |
|---|---|---|---|---|
| 6,995,602 B2 * | 2/2006 | Pelliconi | ............... | H02M 3/073 |
| | | | | 327/536 |
| 7,605,637 B2 * | 10/2009 | Pannizzo | ............... | H02M 3/073 |
| | | | | 363/59 |
| 7,746,041 B2 | 6/2010 | Xu et al. | | |
| 9,172,300 B2 | 10/2015 | Li et al. | | |
| 2004/0169547 A1 * | 9/2004 | Jones | ..................... | H05B 44/00 |
| | | | | 327/536 |
| 2005/0110559 A1 * | 5/2005 | Farkas | ................... | H02M 3/07 |
| | | | | 327/536 |

\* cited by examiner

*Primary Examiner* — Tomi Skibinski
(74) *Attorney, Agent, or Firm* — Perkins Coie LLP

(57) ABSTRACT

A charge pump comprises two bridge arms coupled in parallel, two capacitors, and a control circuit. Each bridge arm has two pairs of switches coupled in series, each pair of switches having two switches coupled in series through a common node. Each capacitor is connected between the two common nodes of the corresponding bridge arm. The control circuit provides a mode signal by comparing an output voltage of the charge pump with two threshold voltages via a hysteretic comparison, and provides two control signals with opposite logic states based on the mode signal to control each pair of the switches to work complementarily, wherein the logic states of the control signals flip in response to transiting from a first status to a second status of the mode signal, and maintain in response to transiting from the second status to the first status of the mode signal.

20 Claims, 11 Drawing Sheets

CHARGE PUMP WITH IMPROVED LIGHT-LOAD EFFICIENCY AND CONTROL METHOD THEREOF

CROSS-REFERENCE TO RELATED APPLICATIONS

This application claims the benefit of CN application 202210481003.6, filed on May 5, 2022, and incorporated herein by reference.

BACKGROUND OF THE INVENTION

1. Field of the Invention

The present invention generally relates to electronic circuits, and more particularly, relates to control circuits for charge pumps and control methods thereof.

2. Description of Related Art

Charge pumps are switching converters which use capacitors to store energy. Instead of using inductors or control loops, a charge pump controls the capacitors to switch between a charging state and a discharging state by turning ON and OFF a plurality of power switches, and thus achieves voltage conversion. Compared with traditional DC-DC switching converters with inductors, the charge pumps have a smaller size, and can provide higher efficiency, smaller output ripples, and simpler control.

The charge pumps are widely used in high-performance cellphones which are becoming increasingly thin. For example, to be compatible with existing applications of one-cell battery, when two-cell batteries are used in a cellphone charging system to supply a load, it is often required to use the charge pump to reduce the voltage of the two-cell batteries to be within a voltage range of the one-cell battery. Besides, it remains a problem that how to make the charge pump work efficiently when in a light load condition to improve the overall efficiency.

SUMMARY OF THE INVENTION

Embodiments of the present invention are directed to a control circuit for a charge pump. The charge pump comprises two bridge arms coupled in parallel between an input node which receives an input voltage and a reference ground, and two capacitors corresponding to the two bridge arms. Each of the bridge arms has two pairs of switches coupled in series through an output node to provide an output voltage, and each of the two pairs of switches has two switches coupled in series through a common node of the corresponding bridge arm. Each of the two capacitors is connected between the two common nodes of the corresponding bridge arm. The control circuit comprises a judging circuit and a logic circuit. The judging circuit is configured to provide a mode signal by comparing the output voltage of the charge pump with a first threshold voltage and a second threshold voltage via a hysteretic comparison. The logic circuit is configured to provide a first control signal and a second control signal based on the mode signal, wherein the first control signal and the second control signal have opposite logic states to control each of the two pairs of switches of the charge pump to work complementarily. The logic states of the first control signal and the second control signal flip in response to transiting from a first status to a second status of the mode signal, and the logic states of the first control signal and the second control signal maintain in response to transiting from the second status to the first status of the mode signal.

Embodiments of the present invention are directed to a charge pump, comprising an input node to receive an input voltage, an output node to provide an output voltage, two bridge arms coupled in parallel between the input node and a reference ground, two capacitors, and a control circuit. Each of the two bridge arms has two pairs of switches coupled in series through an output node, and wherein each of the two pairs of switches has two switches coupled in series through a common node of the corresponding bridge arm. One of the two capacitors is connected between the two common nodes of one of the two bridge arms, and the other one of the two capacitors is connected between the two common nodes of the other one of the two bridge arms. The control circuit is configured to provide a first control signal and a second control signal having opposite logic states to control each of the two pairs of switches of the charge pump to work complementarily, and configured to keep one of the two capacitors electrically coupled between the input node and the output node, and to keep the other one of the two capacitors electrically coupled between the output node and the reference ground.

Embodiments of the present invention are directed to a control method for a charge pump. The charge pump comprises two bridge arms coupled in parallel between an input node which receives an input voltage and a reference ground, and two capacitors corresponding to the two bridge arms. Each of the two bridge arms having two pairs of switches coupled in series through an output node to provide an output voltage, and each of the two pairs of switches having two switches coupled in series through a common node of the corresponding bridge arm. One of the two capacitors is connected between the two common nodes of one of the two bridge arms, and the other one of the two capacitors is connected between the two common nodes of the other one of the two bridge arms. The control method comprises providing a mode signal by comparing an output voltage of the charge pump with a first threshold voltage and a second threshold voltage via a hysteretic comparison, flipping logic states of a first control signal and a second control signal in response to transiting from a first status to a second status of the mode signal, and maintaining the logic states of the first control signal and the second control signal in response to transiting from the second status to the first status of the mode signal. Wherein the first control signal and the second control signal have opposite logic states to control each of the two pairs of switches of the charge pump to work complementarily.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
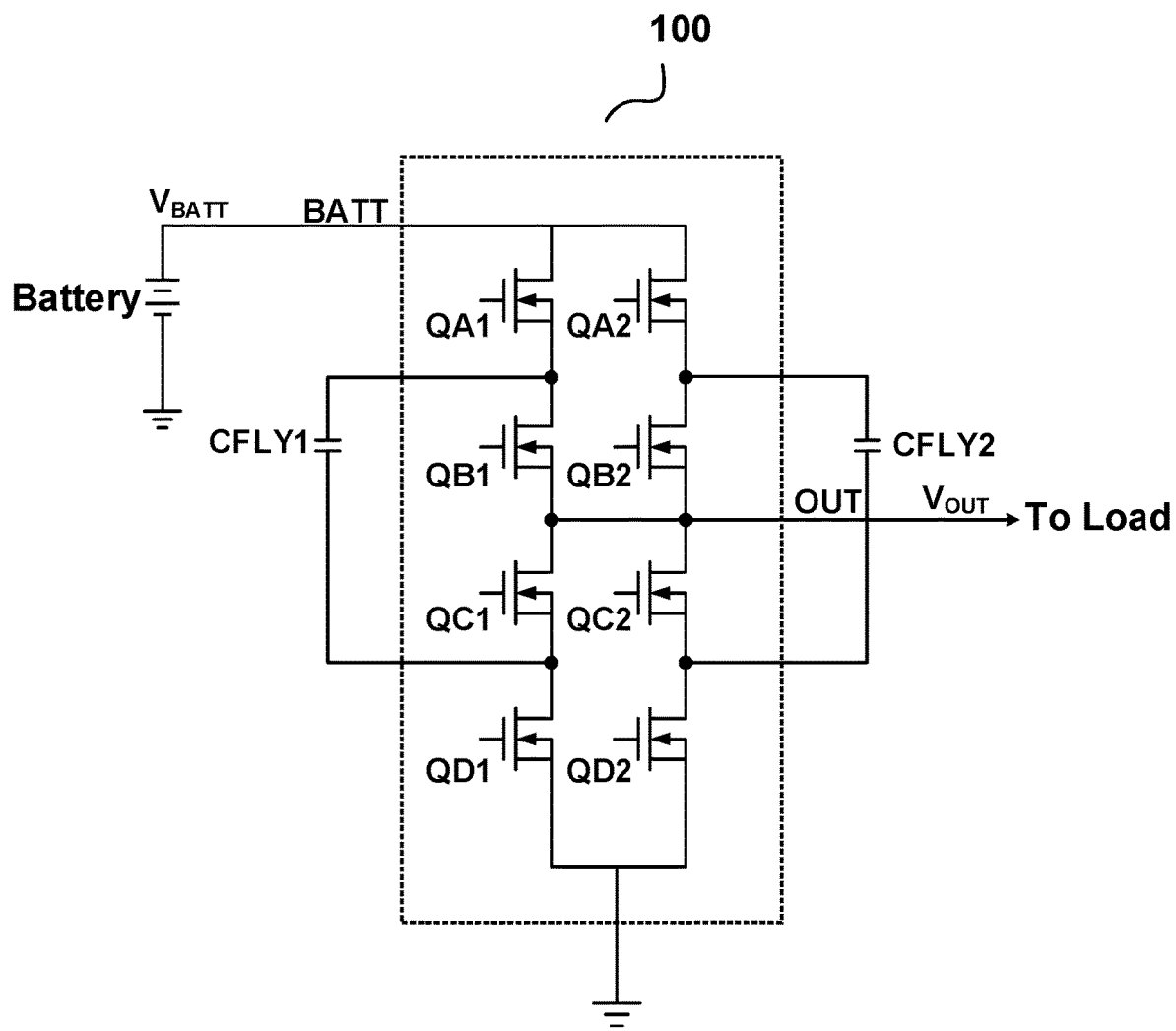
FIG. 1 schematically shows a charge pump 100 in prior art.

FIG. 1 schematically shows a charge pump 100 in prior art. As shown in FIG. 1, the charge pump 100 is a two-phase interleaved charge pump, comprising a left bridge arm and a right bridge arm. The left bridge arm includes switches QA1, QB1, QC1, and QD1, and the right bridge arm includes switches QA2, QB2, QC2, and QD2. A fly capacitor CFLY1 is coupled to the left bridge arm of the charge pump 100, and a fly capacitor CFLY2 is coupled to the right bridge arm of the charge pump 100. The charge pump 100 converts an input voltage $V_{BATT}$ of two batteries to an output voltage $V_{OUT}$ by turning ON and OFF the switches of the left bridge arm and the right bridge arm, and provides the output voltage $V_{OUT}$ to a load.

Figure 2A:
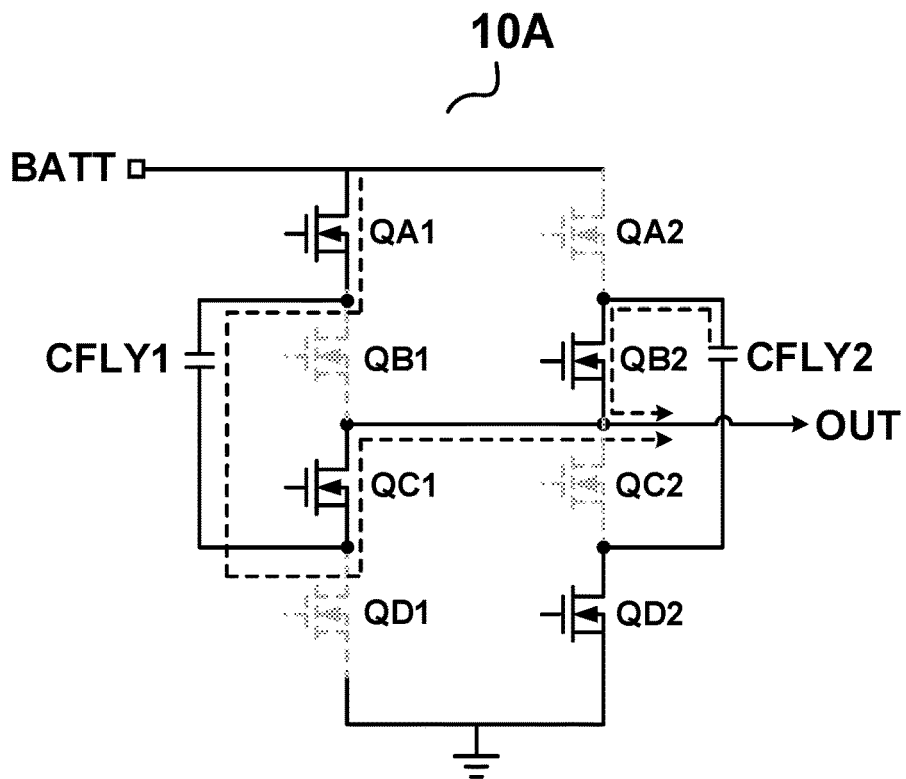
FIGS. 2A-2C show current paths of the charge pump 100 working in a light load condition.
Figure 2B:
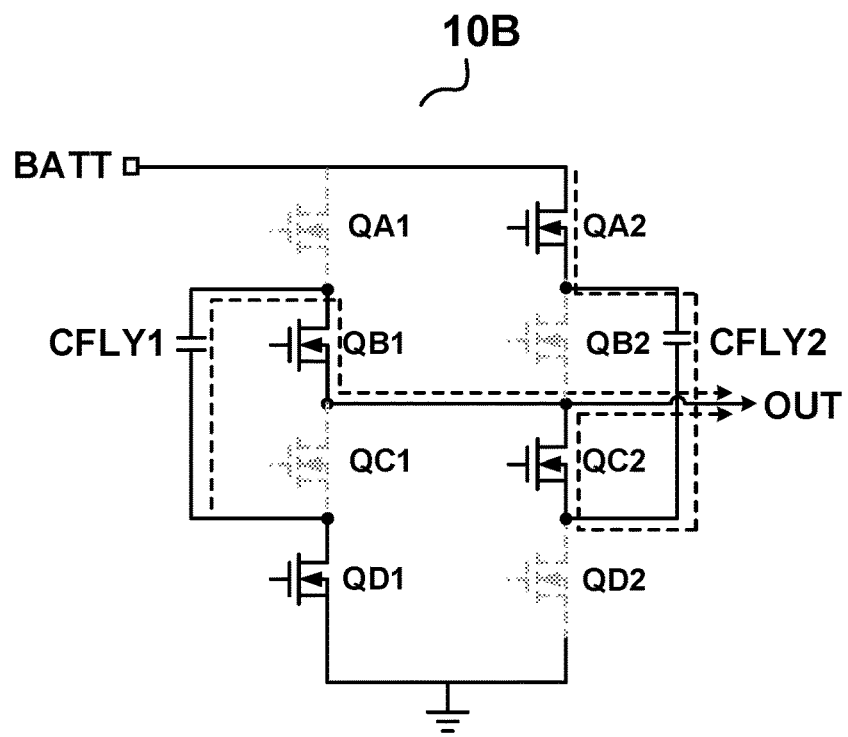
Figure 2C:
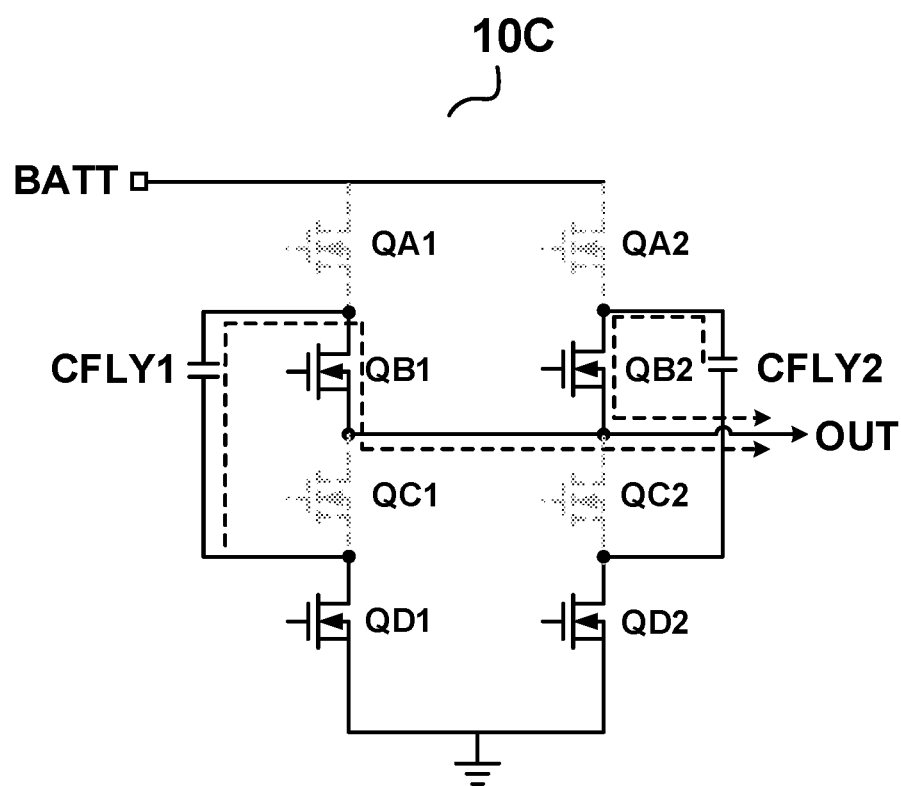

FIGS. 2A-2C show current paths of the charge pump 100 working in a light load condition, wherein the term "light load condition" means an output current flowing through the load is smaller than a current threshold. In the light load condition, the charge pump 100 goes through a plurality of cycles, each cycle comprising operation states 10A, 10B and 10C with an order of 10A, 10B, 10A, and 10C.

Figure 3:
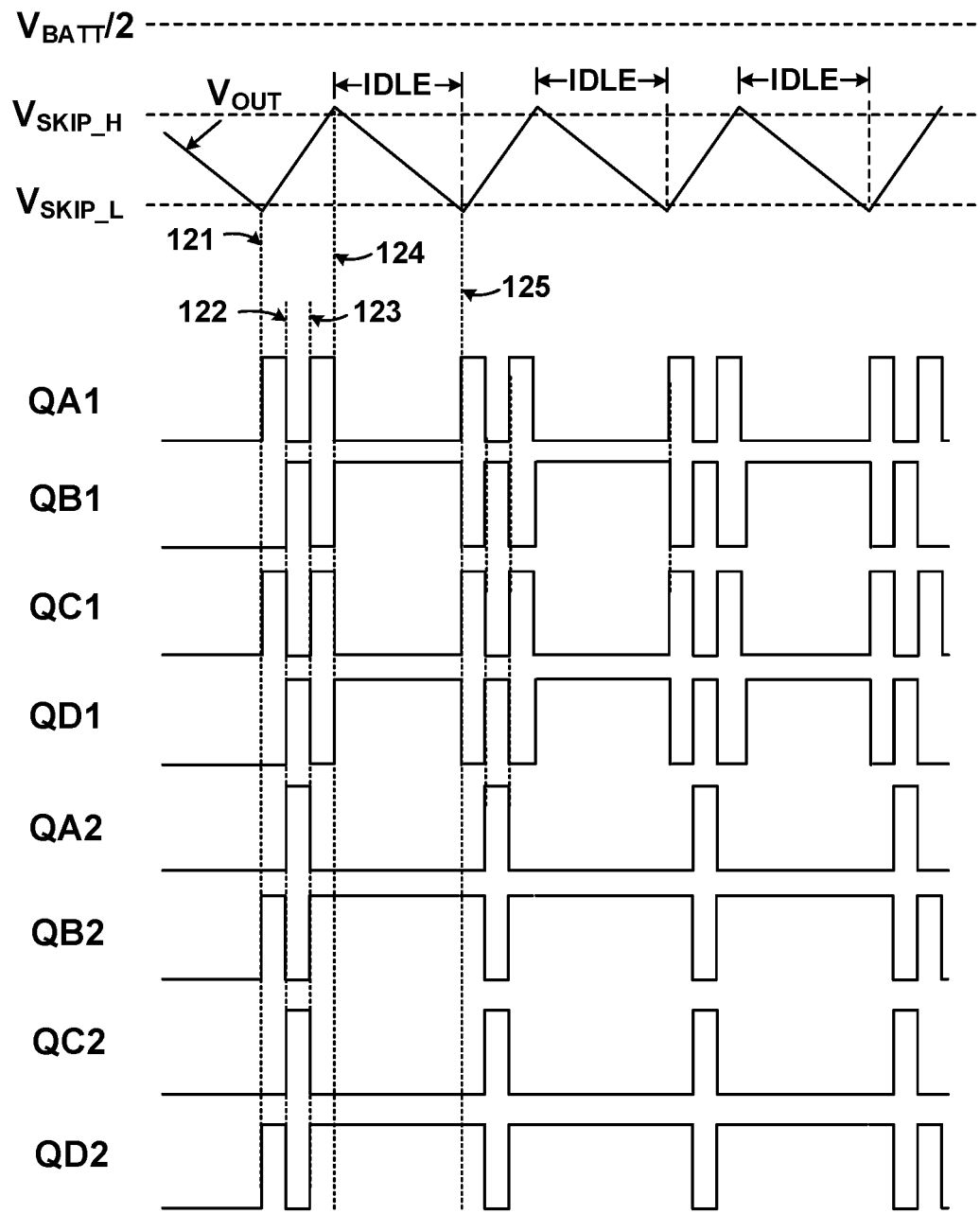
FIG. 3 shows a timing diagram of the charge pump 100 working in the light load condition.

FIG. 3 shows a timing diagram of the charge pump 100 working in the light load condition. As shown in FIG. 3, when the output voltage $V_{OUT}$ decreases to a skipping threshold voltage $V_{SKIP\_L}$ (i.e., at a time 121), the charge pump 100 enters the operation state 10A.

As shown in FIG. 2A, during the operation state 10A, the switches QA1, QC1, QB2, and QD2 are ON, and the switches QB1, QD1, QA2, and QC2 are OFF. The input voltage $V_{BATT}$ charges an output node OUT through the fly capacitor CFLY1, and the fly capacitor CFLY1 is charged. Meanwhile, the fly capacitor CFLY2 charges the output node OUT, and the fly capacitor CFLY2 discharges.

At a time 122 shown in FIG. 3, the charge pump 100 enters the operation state 10B. As shown in FIG. 2B, during the operation state 10B, the switches QB1, QD1, QA2, and QC2 are ON, and the switches QA1, QC1, QB2, and QD2 are OFF. The input voltage $V_{BATT}$ charges the output node OUT through the fly capacitor CFLY2, and the fly capacitor CFLY2 is charged. Meanwhile, the fly capacitor CFLY1 charges the output node OUT, and the fly capacitor CFLY1 discharges. At a time 123 shown in FIG. 3, the charge pump 100 enters the operation state 10A again as illustrated in FIG. 2A.

When the output voltage $V_{OUT}$ increases to a skipping threshold voltage $V_{SKIP\_H}$ (i.e., at a time 124 shown in FIG. 3), the charge pump 100 enters the operation state 10C, that is, the charge pump 100 enters an IDLE state, i.e., both the fly capacitors CFLY1 and CFLY2 discharge. As shown in FIG. 2C, during the operation state 10C, the switches QA1, QA2, QC1, and QC2 are OFF, and the switches QB1, QD1, QB2, and QD2 are ON. The fly capacitors CFLY1 and CFLY2 charge the output node OUT, and the fly capacitors CFLY1 and CFLY2 discharge.

Still referring to FIG. 3, when the output voltage $V_{OUT}$ decreases again to the skipping threshold voltage $V_{SKIP\_L}$ (i.e., at a time 125), the current cycle ends and the charge pump 100 enters the next cycle. Apparently, during the whole process of the light load condition, the output voltage $V_{OUT}$ of the charge pump 100 is always smaller than half of the input voltage $V_{BATT}$. The light-load efficiency of the charge pump 100 is not high, for example, only 98%. Therefore, it is in need to propose an improved control strategy for charge pumps working in the light load condition.

Figure 4:
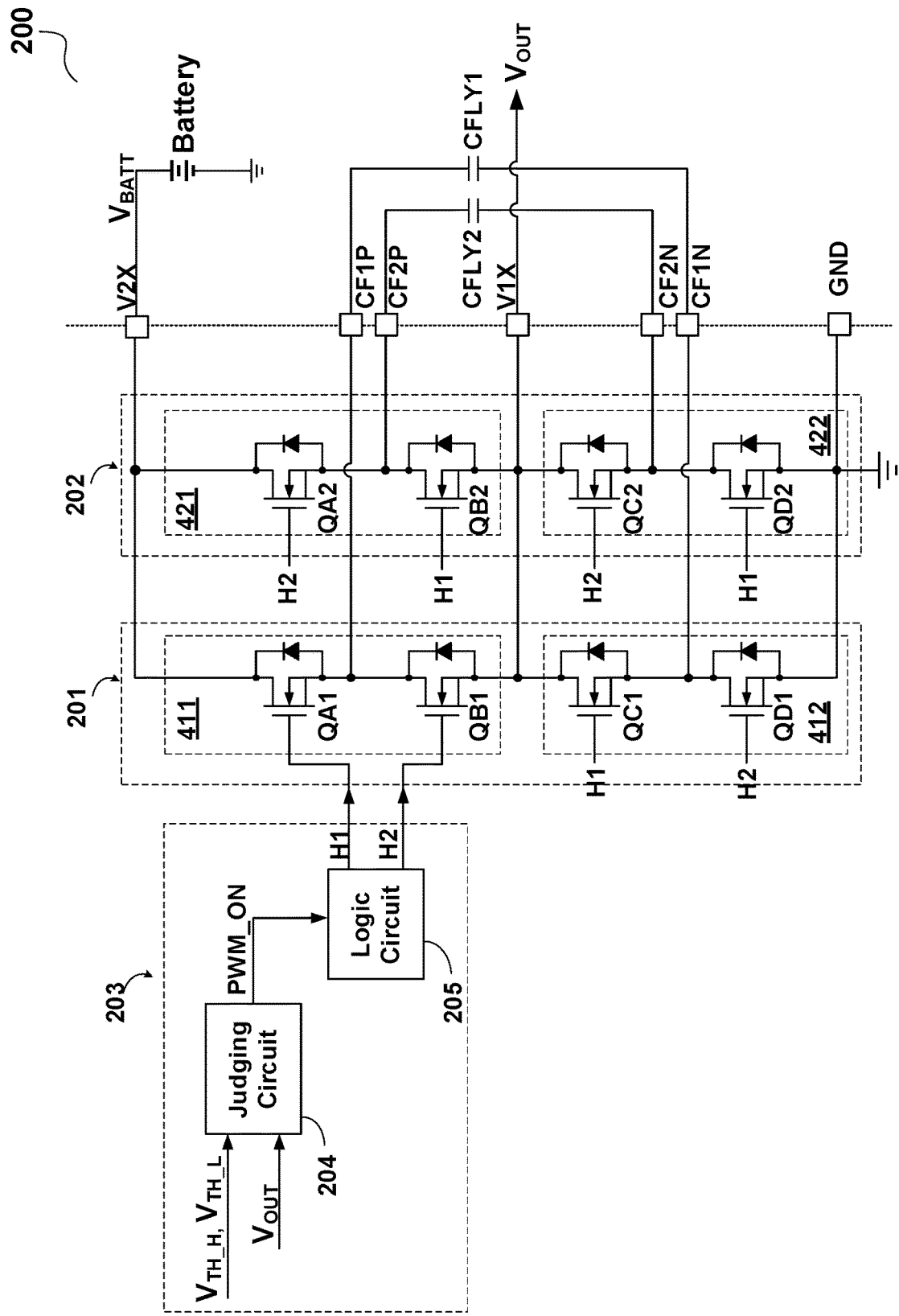
FIG. 4 schematically illustrates a charge pump 200 in accordance with an embodiment of the present invention.

FIG. 4 schematically illustrates a charge pump 200 in accordance with an embodiment of the present invention. In the example of FIG. 4, the charge pump 200 comprises an input node V2X, an output node V1X, bridge arms 201 and 202, fly capacitors CFLY1 and CFLY2, and a control circuit 203. The bridge arm 201 is coupled between the input node V2X and a reference ground GND, comprising a pair of switches 411 and a pair of switches 412 coupled in series through the output node V1X. The bridge arm 202 is coupled between the input node V2X and the reference ground GND, comprising a pair of switches 421 and a pair of switches 422 coupled in series through the output node V1X. Each of the pairs of switches 411, 412, 421, and 422 comprises two switches which are coupled in series through a common node. The fly capacitor CFLY1 is coupled between a common node CF1P and a common node CF1N of the bridge arm 201, and the fly capacitor CFLY2 is coupled between a common node CF2P and a common node CF2N of the bridge arm 202.

The control circuit 203 provides control signals H1 and H2 to control the pairs of switches 411, 412, 421, and 422, such that the two switches of each pair of switches are turned ON and OFF complementarily. Logic states of the control signals H1 and H2 are opposite, that is, when the control signal H1 is at logic high, the control signal H2 is at logic low, and vice versa. In some examples, a voltage level between a high threshold voltage (e.g., 2V) and a voltage source (e.g., 3.3V) is considered as logic high ("1"), a voltage level between zero voltage (0 V) and a low threshold voltage (e.g., 1V) is considered as logic low ("0").

As shown in FIG. 4, the control circuit 203 comprises a judging circuit 204 and a logic circuit 205. The judging circuit compares the output voltage $V_{OUT}$ with a threshold voltage $V_{TH\_L}$ and a threshold voltage $V_{TH\_H}$ via a hysteretic comparison to provide a mode signal PWM_ON. When the output voltage $V_{OUT}$ decreases to be smaller than the threshold voltage $V_{TH\_L}$, the mode signal PWM_ON transits from a first status to a second status. When the output voltage $V_{OUT}$ increases to be larger than the threshold voltage $V_{TH\_H}$, which indicates that the charge pump 200 is in the light load condition, the mode signal PWM_ON transits from the second status to the first status. In the embodiments of the present invention, the first status comprises logic low, and the second status comprises logic high.

The logic circuit 205 receives the mode signal PWM_ON, and provides control signals H1 and H2 based on the mode signal PWM_ON, wherein the control signals H1 and H2 control each pair of switches of the charge pump 200 to work complementarily. Specifically, the logic circuit 205 flips the logic states of the control signals H1 and H2 in response to rising edges of the mode signal PWM_ON, and maintains the logic states of the control signals H1 and H2 in response to falling edges of the mode signal PWM_ON.

Figure 5A:
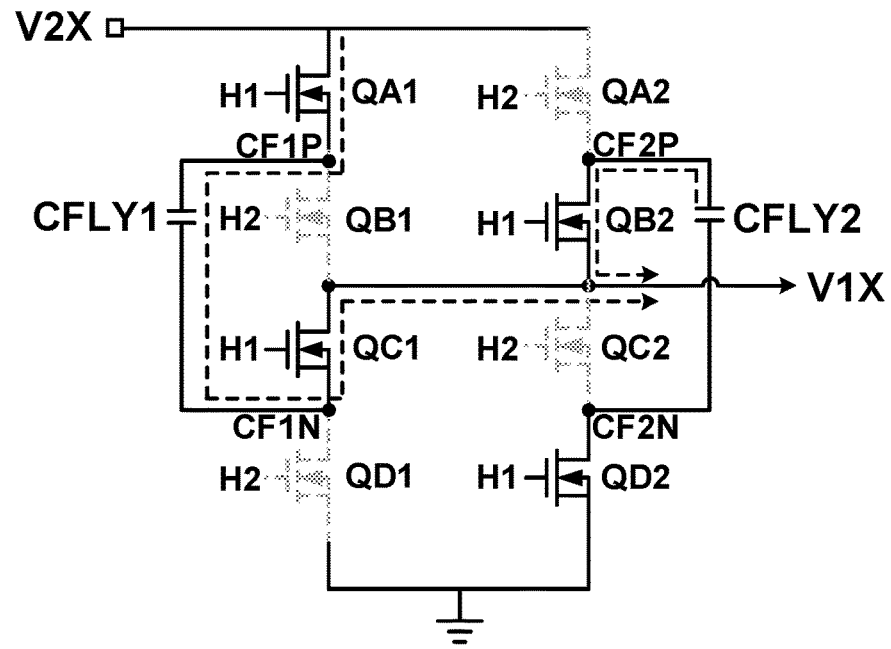
FIGS. 5A-5B show current paths of the charge pump 200 in accordance with an embodiment of the present invention.
Figure 5B:
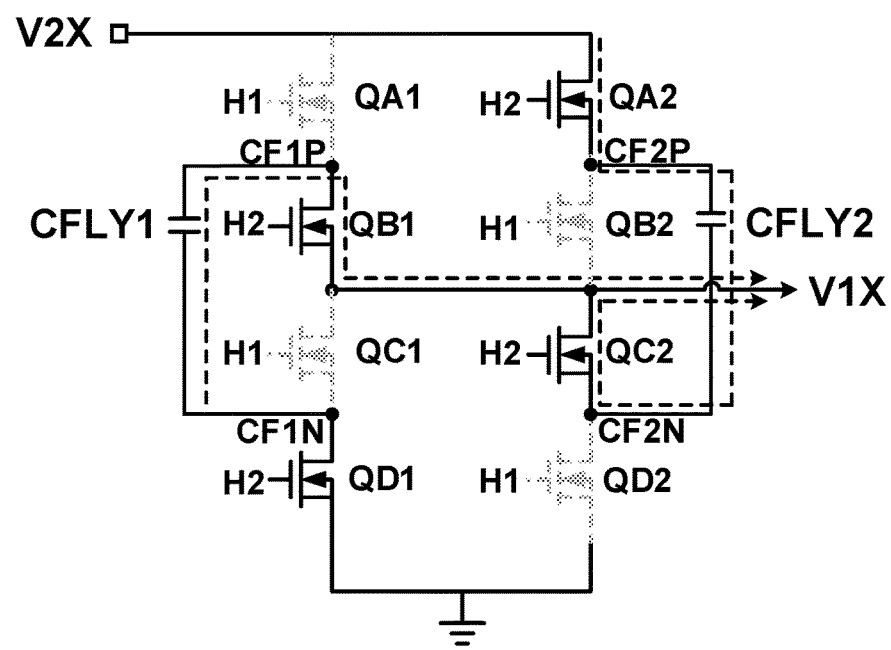

FIGS. 5A-5B show current paths of the charge pump 200 in accordance with an embodiment of the present invention. In the embodiment of FIG. 4, the operation of the charge pump 200 in the light load condition only comprises operation states 20A and 20B.

Figure 6:
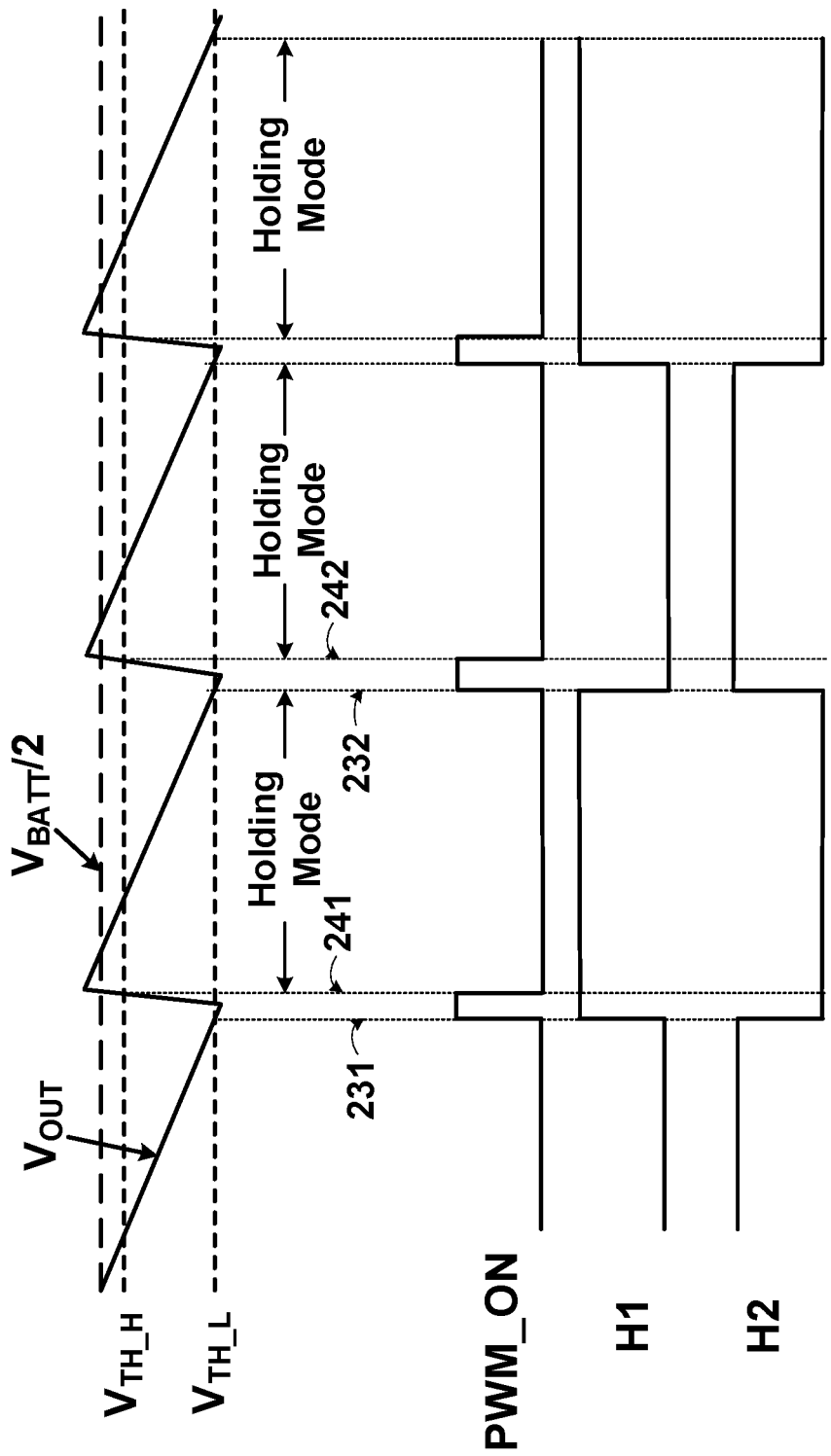
FIG. 6 shows a timing diagram of the charge pump 200 working in the light load condition.

FIG. 6 shows a timing diagram of the charge pump 200 working in the light load condition. As shown in FIG. 6, when the output voltage $V_{OUT}$ decreases to be smaller than the threshold voltage $V_{TH\_L}$, the mode signal PWM_ON transits from logic low to logic high. The logic circuit 205 detects a rising edge of the mode signal PWM_ON and triggers the control signals H1 and H2 to flip their logic states. For example, at a time 231, the control signal H1 turns from logic low to logic high, and the control signal H2 turns from logic high to logic low.

The charge pump 200 then works in the operation state 20A. As shown in FIG. 5A, during the operation state 20A, the switches QA1, QC1, QB2, and QD2 are ON, and the switches QB1, QD1, QA2, and QC2 are OFF under the control of the control signals H1 and H2 provided by the logic circuit 205. The input voltage $V_{BATT}$ charges the output node V1X through the fly capacitor CFLY1, and the fly capacitor CFLY1 is charged. Meanwhile, the fly capacitor CFLY2 charges the output node V1X, and the fly capacitor CFLY2 discharges.

Still referring to FIG. 6, the output voltage $V_{OUT}$ increases rapidly under the control of the logic circuit 205. When the output voltage $V_{OUT}$ increases to be larger than the threshold voltage $V_{TH\_H}$, the mode signal PWM_ON transits from logic high to logic low, the charge pump 200 enters a holding mode of the present invention. In response to a falling edge of the mode signal PWM_ON, the logic circuit 205 maintains the logic states of the control signals H1 and H2 and clamps the charge pump 200 to still work in the operation state 20A. For example, at a time 241 shown in FIG. 6, the logic states of the control signals H1 and H2 remain unchanged.

Still referring to FIG. 6, when the output voltage $V_{OUT}$ decreases again to be smaller than the threshold voltage $V_{TH\_L}$, the mode signal PWM_ON transits from logic low to logic high. The logic circuit 205 detects a rising edge of the mode signal PWM_ON and triggers the control signals H1 and H2 to flip their logic states. For example, at a time 232, the control signal H1 turns from logic high to logic low, and the control signal H2 turns from logic low to logic high. The charge pump 200 then enters the operation state 20B.

As shown in FIG. 5B, during the operation state 20B, the switches QA2, QC2, QB1, and QD1 are ON, and the switches QB2, QD2, QA1, and QC1 are OFF under the control of the control signals H1 and H2 provided by the logic circuit 205. The input voltage $V_{BATT}$ charges the output node V1X through the fly capacitor CFLY2, and the fly capacitor CFLY2 is charged. Meanwhile, the fly capacitor CFLY1 charges the output node V1X, and the fly capacitor CFLY1 discharges.

Still referring to FIG. 6, the output voltage $V_{OUT}$ increases rapidly again under the control of the logic circuit 205. When the output voltage $V_{OUT}$ increases to be larger than the threshold voltage $V_{TH\_H}$, the mode signal PWM_ON transits from logic high to logic low, and the charge pump 200 enters the holding mode. The logic circuit 205 clamps the logic states of the control signals H1 and H2 in response to a falling edge of the mode signal PWM_ON, such that the logic states of the control signals H1 and H2 remain unchanged, and the charge pump 200 is therefore clamped to work in the operation state 20B. Until the output voltage $V_{OUT}$ decreases again to be smaller than the threshold voltage $V_{TH\_L}$, the mode signal PWM_ON transits to logic high, and the logic states of the control signals H1 and H2 are flipped again, indicating that a cycle (comprising operation states 20A and 20B) ends, and the charge pump 200 enters a new cycle. In the embodiments of the present invention, the logic state of the control signal H1 flips twice as a cycle.

As mentioned before, the charge pump 100 starts to work in the IDLE state when the output voltage $V_{OUT}$ increases to the skipping threshold voltage $V_{SKIP\_H}$, as shown in FIG. 3, with both the fly capacitors CFLY1 and CFLY2 disconnected from an input node BATT (i.e., disconnected from the input voltage $V_{BATT}$) and the fly capacitors CFLY1 and CFLY2 are coupled between the output node OUT and a reference ground, and both the fly capacitors CFLY1 and CFLY2 discharge. However, in the embodiment of FIG. 6, when the output voltage $V_{OUT}$ increases to be larger than the threshold voltage $V_{TH\_H}$, the charge pump 200 working in the light load condition always keeps one of the fly capacitors CFLY1 and CFLY2 coupled between the input node V2X and the output node V1X, and keeps the other one of the fly capacitors CFLY1 and CFLY2 coupled between the output node V1X and the reference ground GND, which is apparently different from the charge pump 100.

In the example of FIG. 6, before each rising edge of the mode signal PWM_ON, a voltage developed across the fly capacitor coupled between the input node V2X and the output node V1X (the fly capacitor CFLY1 or the fly capacitor CFLY2) is $V_{BATT}/2+(V_{BATT}/2-V_{TH\_L})$. Furthermore, since the capacitances of the fly capacitors CFLY1 and CFLY2 are usually much larger than the capacitance of an output capacitor (not shown) coupled between the output node V1X and the reference ground GND. Thus, when the charge pump 200 is in the light load condition and the rising edge of the mode signal PWM_ON comes, a peak value of the output voltage $V_{OUT}$ can increase to be larger than half of the input voltage $V_{BATT}$ with the logic states of the control signals H1 and H2 only flipped once, and the efficiency of the charge pump 200 is thus improved. For example, the overall efficiency of the charge pump can reach 99%.

Figure 7:
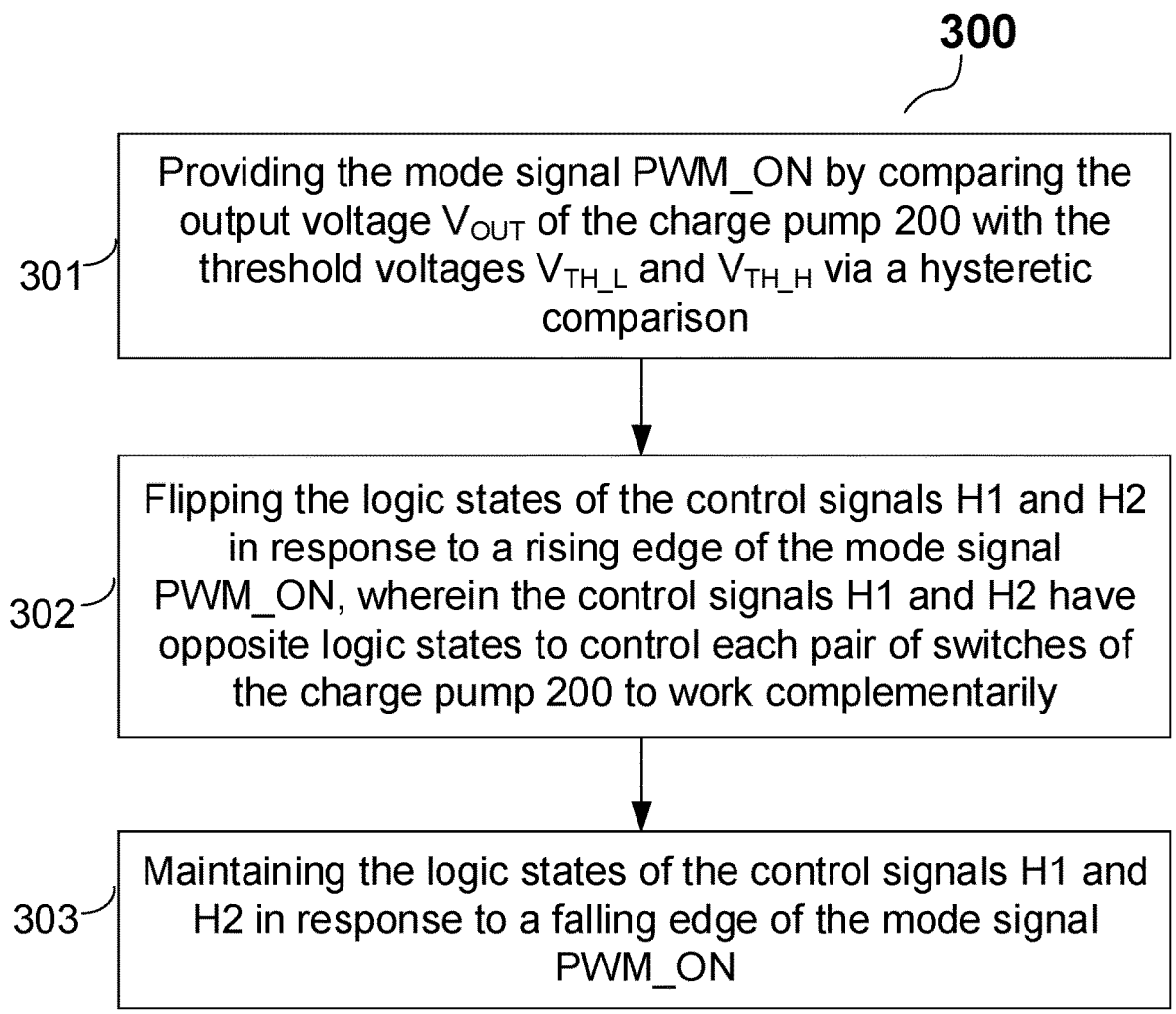
FIG. 7 illustrates a control method 300 for the charge pump 200 working in the light load in accordance with an embodiment of the present invention.

FIG. 7 illustrates a control method 300 for the charge pump 200 working in the light load condition in accordance with an embodiment of the present invention. The control method 300 comprises steps 301-303.

In step 301, providing the mode signal PWM_ON by comparing the output voltage $V_{OUT}$ of the charge pump 200 with the threshold voltages $V_{TH\_L}$ and $V_{TH\_H}$ via a hysteretic comparison. When the output voltage $V_{OUT}$ decreases to be smaller than the threshold voltage $V_{TH\_L}$, the mode signal PWM_ON transits from logic low to logic high. When the output voltage $V_{OUT}$ increases to be larger than the threshold voltage $V_{TH\_H}$, the mode signal PWM_ON transits from logic high to logic low, and the charge pump 200 enters the holding mode.

In step 302, the logic circuit 205 flips the logic states of the control signals H1 and H2 in response to a rising edge of the mode signal PWM_ON, wherein the control signals H1 and H2 are in opposite logic states to control each pair of switches of the charge pump 200 to work complementarily.

In step 303, the charge pump 200 enters the holding mode and the logic states of the control signals H1 and H2 are maintained in response to a falling edge of the mode signal PWM_ON.

Figure 8:
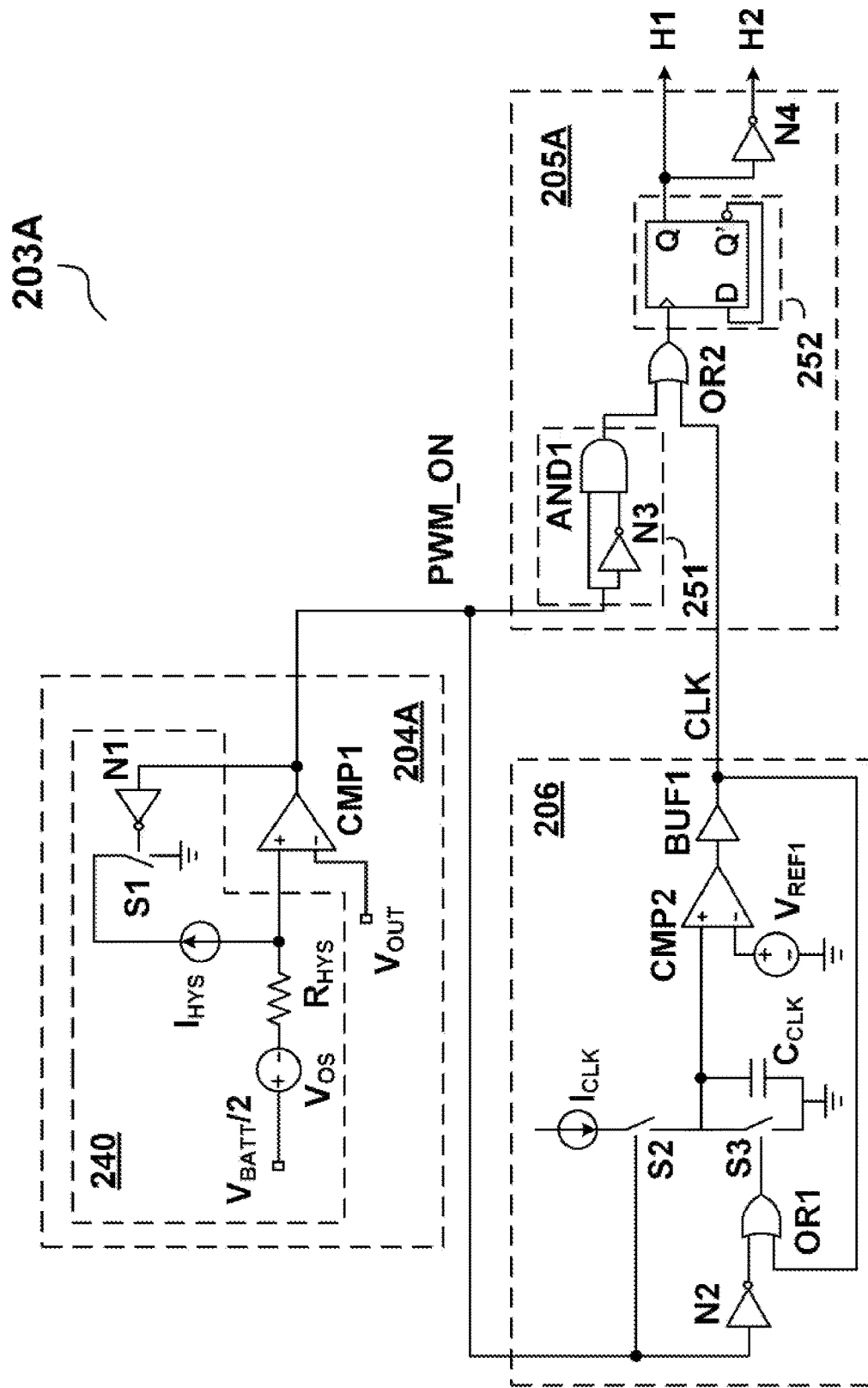
FIG. 8 schematically illustrates a control circuit 203A shown in FIG. 4 in accordance with an embodiment of the present invention.

FIG. 8 schematically illustrates a control circuit 203A shown in FIG. 4 in accordance with an embodiment of the present invention. The control circuit 203A provides the control signals H1 and H2 for the charge pump 200 of FIG. 4 to control each pair of switches of the charge pump 200 to work complementarily.

In the example of FIG. 8, the control circuit 203A comprises a judging circuit 204A and a logic circuit 205A, and further comprises a clock pulse generating circuit 206. The judging circuit 204A comprises a hysteresis comparator CMP1 and a threshold generating circuit 240. The threshold generating circuit 240 is configured to provide the threshold voltages $V_{TH\_L}$ and $V_{TH\_H}$ for deciding how to control the charge pump 200 in the light load condition.

The hysteresis comparator CMP1 has a non-inverting input terminal, an inverting input terminal, and an output terminal. The non-inverting input terminal of the hysteresis comparator CMP1 is coupled to an output terminal of the threshold generating circuit 240 to receive the threshold voltages $V_{TH\_L}$ and $V_{TH\_H}$, and the inverting input terminal of the hysteresis comparator CMP1 receives the output voltage $V_{OUT}$. The hysteresis comparator CMP1 provides the mode signal PWM_ON at its output terminal by comparing the output voltage $V_{OUT}$ with the threshold voltage $V_{TH\_L}$ and the threshold voltage $V_{TH\_H}$. the threshold generating circuit 240 comprises an offset voltage source $V_{OS}$, a resistor $R_{HYS}$, a current source $I_{HYS}$, a switch S1, and an inverter N1. The resistor $R_{HYS}$ has a first terminal and a second terminal, wherein the first terminal of the resistor $R_{HYS}$ receives a voltage difference of $V_{BATT}/2$ and an offset voltage, and the second terminal of the resistor $R_{HYS}$ is coupled to the non-inverting input terminal of the hysteresis comparator CMP1. The current source $I_{HYS}$ has a supply terminal and an output terminal, wherein the output terminal of the current source $I_{HYS}$ is coupled to the second terminal of the resistor $R_{HYS}$ The switch S1 has a first terminal, a second terminal and a control terminal. The first terminal of the switch S1 is coupled to the output terminal of the current source $I_{HYS}$, the second terminal of the switch S1 is coupled to the reference ground GND, and the control terminal of the switch S1 is coupled to the output terminal of the hysteresis comparator CMP1.

In the example of FIG. 8, the resistor $R_{HYS}$ and the current source $I_{HYS}$ generate a hysteresis of the hysteresis comparator CMP1, and the offset voltage source $V_{OS}$ provides the offset voltage. When the output voltage $V_{OUT}$ increases to be larger than the threshold voltage $V_{TH\_H}$, the charge pump 200 enters the holding mode, the hysteresis comparator CMP1 provides the mode signal PWM_ON with logic low, the switch S1 is turned ON, and the threshold generating circuit 240 provides the threshold voltage $V_{TH\_L}$ to the non-inverting input terminal of the hysteresis comparator CMP1, wherein the threshold voltage $V_{TH\_L}$ is equal to $(V_{BATT}/2-V_{OS}-R_{HYS}\times I_{HYS})$ When the output voltage $V_{OUT}$ decreases to be smaller than the threshold voltage $V_{TH\_L}$, the hysteresis comparator CMP1 provides the mode signal PWM_ON with logic high, the switch S1 is turned OFF, and the threshold generating circuit 240 provides the threshold voltage $V_{TH\_H}$ to the non-inverting input terminal of the hysteresis comparator CMP1, wherein the threshold voltage $V_{TH\_H}$ is equal to $(V_{BATT}/2-V_{OS})$.

The clock pulse generating circuit 206 receives the mode signal PWM_ON, and provides a clock pulse signal CLK with a fixed frequency based on the mode signal PWM_ON with logic high. In the example of FIG. 8, the clock pulse generating circuit 206 comprises a current source $I_{CLK}$, a switch S2, a switch S3, an inverter N2, an OR gate OR1, a capacitor $C_{CLK}$, a reference voltage source VREF1, a comparator CMP2, and a buffer BUF1. The current source $I_{CLK}$ has a supply terminal and an output terminal, wherein the supply terminal of the current source $I_{CLK}$ is coupled to a supply voltage. The switch S2 has a first terminal, a second terminal and a control terminal, wherein the first terminal of the switch S2 is coupled to the output terminal of the current source $I_{CLK}$, and the control terminal of the switch S2 receives the mode signal PWM_ON. The OR gate OR1 has a first input terminal, a second input terminal, and an output terminal, wherein the first input terminal of the OR gate OR1 receives the mode signal PWM_ON via the inverter N2, and the second input terminal of the OR gate OR1 receives the clock pulse signal CLK. The switch S3 has a first terminal, a second terminal and a control terminal, wherein the first terminal of the switch S3 is coupled to the second terminal of the switch S2, the second terminal of the switch S3 is coupled to the reference ground GND, and the control terminal of the switch S3 is coupled to the output terminal of the OR gate OR1. The comparator CMP2 has a non-inverting input terminal, an inverting input terminal, and an output terminal, wherein the non-inverting input terminal of the comparator CMP2 is coupled to the second terminal of the switch S2 and the first terminal of the switch S3, the inverting input terminal of the comparator CMP2 is coupled to the reference voltage source VREF1 to receive a reference voltage, and the output terminal of the comparator CMP2 provides the clock pulse signal CLK via the buffer circuit BUF1. The capacitor $C_{CLK}$ is coupled between the non-inverting input terminal of the comparator CMP2 and the reference ground GND.

As shown in FIG. 8, during a time period when the mode signal PWM_ON is at logic high, the switch S2 is ON under the control of the clock pulse generating circuit 206, and the current source $I_{CLK}$ charges the capacitor $C_{CLK}$. When a voltage across the capacitor $C_{CLK}$ increases to be larger than the reference voltage, the clock pulse signal CLK with logic high is provided at the output terminal of the comparator CMP2. The clock pulse signal CLK with logic high is received by the second input terminal of the OR gate OR1 to turn ON the switch S3, thus the voltage across the capacitor $C_{CLK}$ decreases, and the comparator CMP2 provides the clock pulse signal CLK with logic low. The above operation repeats, and the clock pulse generating circuit 206 provides the clock pulse signal CLK comprising continuous pulses at its output terminal under the control of the mode signal PWM_ON with logic high.

In the example of FIG. 8, the logic circuit 205A comprises a rising edge detection circuit 251, an OR gate OR2, a D flip-flop 252, and an inverter N4. The rising edge detection circuit 251 receives the mode signal PWM_ON and detects rising edges of the mode signal PWM_ON. In one embodiment, the rising edge detection circuit 251 comprises an inverter N3 and an AND gate AND1. The OR gate OR2 comprises a first input terminal, a second input terminal, and an output terminal, wherein the first input terminal of the OR gate OR2 is coupled to the output terminal of the rising edge detection circuit 251, and the second input terminal of the OR gate OR2 is coupled to the output terminal of the clock pulse generating circuit 206 to receive the clock pulse signal CLK. The D flip-flop 252 has an input terminal, a clock terminal, an output terminal, and an inverting output terminal, wherein the input terminal and the inverting output terminal of the D flip-flop 252 are coupled together, the clock terminal is coupled to the output terminal of the OR gate OR2, and the output terminal of the D flip-flop 252 provides a control signal H1, and provides a control signal H2 via the inverter N4. The control signals H1 and H2 are logically complementary.

In a further embodiment, the control circuit 203A further comprises a dead time generating circuit to insert a suitable dead time between the control signal H1 and the control signal H2 to prevent shoot-through of each pair of switches. For example, the dead time is inserted between each falling edge of the control signal H1 and the following rising edge of the control signal H2, and between each falling edge of the control signal H2 and the following rising edge of the control signal H1.

Figure 9:
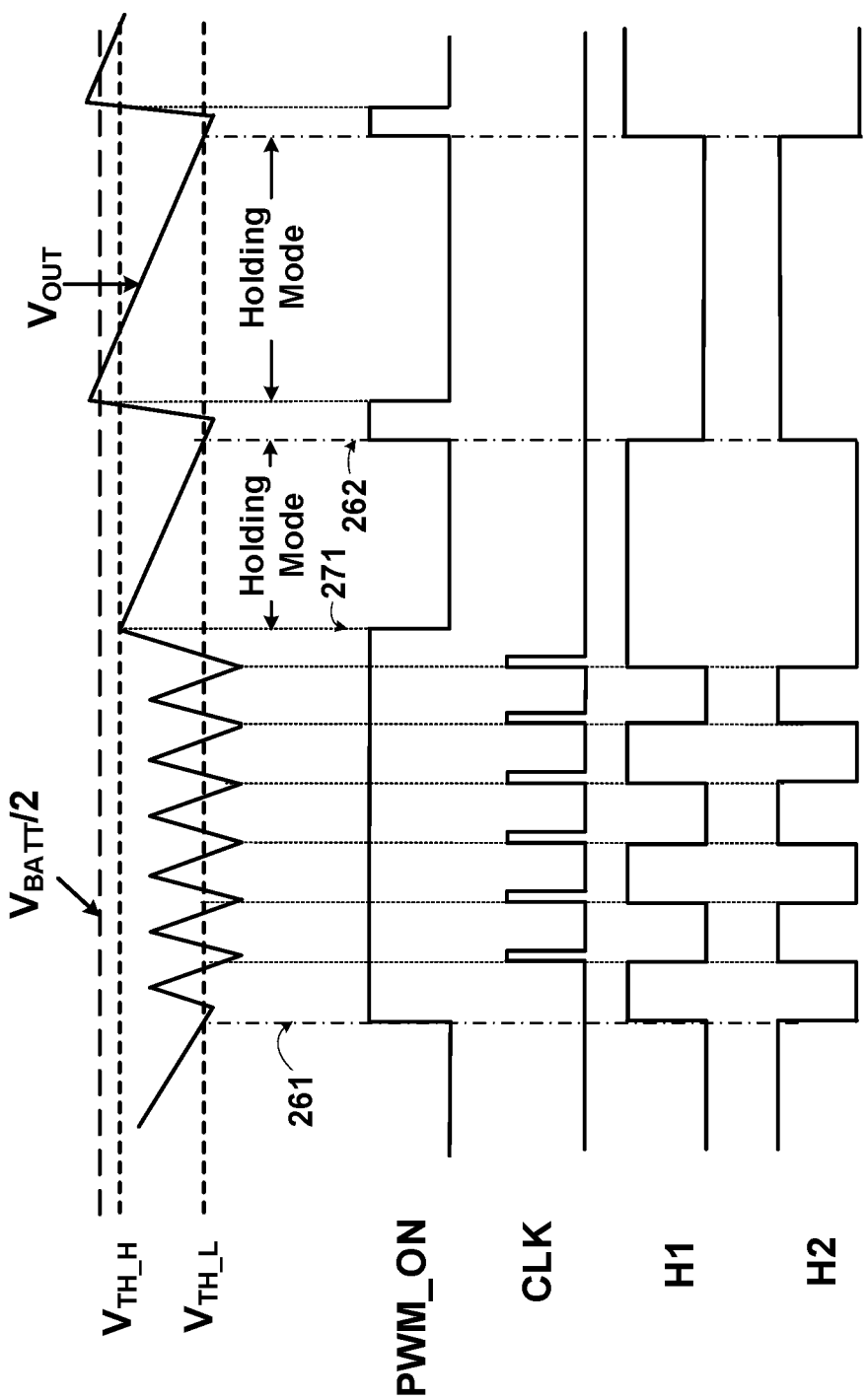
FIG. 9 shows a timing diagram of the charge pump 200 in a non-light load control mode and a light load control mode in accordance with an embodiment of the present invention.

FIG. 9 shows a timing diagram of the charge pump 200 working in a non-light load control mode and a light load control mode in accordance with an embodiment of the present invention. In the embodiment of FIG. 9, the charge pump 200 is controlled by the control circuit 203A shown in FIG. 8. When the output voltage $V_{OUT}$ decreases to be smaller than the threshold voltage $V_{TH\_L}$ (i.e., at a time 261 shown in FIG. 9), the mode signal PWM_ON transits from logic low to logic high. The logic circuit 205A detects a rising edge of the mode signal PWM_ON and triggers the clock terminal of the D flip-flop 252, allowing the input terminal of the D flip-flop 252 to receive the logic state of the inverting output terminal of the D flip-flop 252, such that the logic state of the output terminal of the D flip-flop 252 flips, and the logic states of the control signals H1 and H2 are accordingly flipped.

When a load of the charge pump 200 keeps increasing (i.e., the output current flowing through the load becomes larger) and the charge pump 200 enters the non-light load control mode, the output voltage $V_{OUT}$ is always smaller than the threshold voltage $V_{TH\_H}$, the mode signal remains at logic high, and the switch S1 is maintained OFF. During a time period when the mode signal PWM_ON is at logic high, the clock pulse generating circuit 206 works to provide the clock pulse signal CLK comprising the continuous pulses to the second input terminal of the OR gate OR2. The logic circuit 205A flips the logic states of the control signals H1 and H2 by triggering of the continuous pulses of the clock pulse signal CLK.

When the load of the charge pump 200 reduces (i.e., the output current flowing through the load becomes smaller) and the output voltage $V_{OUT}$ increases to be larger than the threshold voltage $V_{TH\_H}$ (i.e., at a time 271 shown in FIG. 9), the mode signal PWM_ON transits from logic high to logic low, the charge pump 200 exits the non-light load control mode and enters the light load control mode. The clock pulse generating circuit 206 stops working when the mode signal PWM_ON transits to logic low. In response to a falling edge of the mode signal PWM_ON, the control signals H1 and H2 provided by the logic circuit 205A maintain their logic states, and the charge pump 200 is therefore clamped to work in the holding mode. Until the output voltage $V_{OUT}$ decreases again to be smaller than the threshold voltage $V_{TH\_L}$ (e.g., at a time 262), the mode signal PWM_ON transits from logic low to logic high. The logic circuit 205A flips the logic states of the control signals H1 and H2 in response to a rising edge of the mode signal PWM_ON. The working principle of the charge pump 200 after the time 262 will not be described in detail since it is the same as the working principle illustrated in FIG. 6.

In the embodiments of the present invention, the output voltage $V_{OUT}$ of the charge pump 200 working in the light load condition can increase to be larger than half of the input voltage $V_{BATT}$, which improves the efficiency of the charge pump 200. The charge pump 200 also stays in the holding mode for a longer time because the output voltage $V_{OUT}$ decreases to the threshold voltage $V_{TH\_L}$ more slowly.

Figure 10:
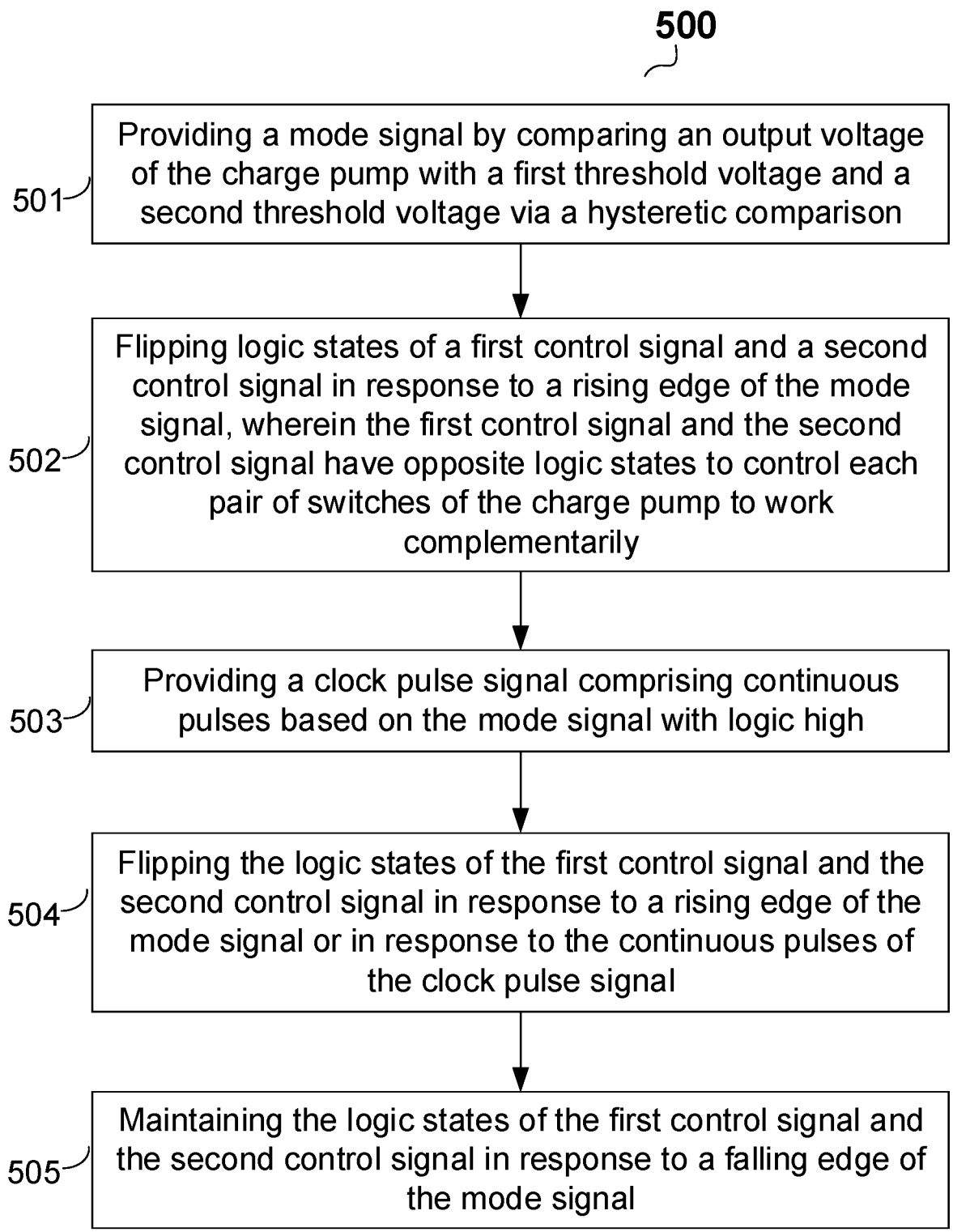
FIG. 10 illustrates a control method 500 for a charge pump in accordance with an embodiment of the present invention.

FIG. 10 illustrates a control method 500 for a charge pump in accordance with an embodiment of the present invention. The charge pump comprises two capacitors and two bridge arms, wherein the two bridge arms are coupled in parallel between an input node and a reference ground. Each bridge arm comprises two pairs of switches coupled in series through an output node, wherein each pair of switches has two switches coupled in series through a common node. One of the two capacitors is coupled between the two common nodes of one of the two bridge arms, and the other capacitor is coupled between the two common nodes of the other bridge arm. The control method 500 comprises steps 501-505 to control the charge pump to work in a light load control mode and a non-light load control mode.

In step 501, providing a mode signal by comparing an output voltage of the charge pump with a first threshold voltage and a second threshold voltage via a hysteretic comparison. When the output voltage decreases to be smaller than the first threshold voltage, the mode signal turns from logic low to logic high, and when the output voltage increases to be larger than the second threshold voltage, the mode signal turns from logic high to logic low.

In step 502, flipping logic states of a first control signal and a second control signal in response to a rising edge of the mode signal, wherein the first control signal and the second control signal are in opposite logic states to control each pair of switches of the charge pump to work complementarily.

In step 503, providing a clock pulse signal comprising continuous pulses based on the mode signal with logic high.

In step 504, changing the logic states of the first control signal and the second control signal in response to a rising edge of the mode signal or in response to the continuous pulses of the clock pulse signal.

In step 505, maintaining the logic states of the first control signal and the second control signal in response to a falling edge of the mode signal.

In one embodiment, the charge pump always keeps one of the two capacitors coupled between the input node and the output node, and keeps the other one of the two capacitors coupled between the output node and the reference ground.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

The invention claimed is:

1. A control circuit for a charge pump, wherein the charge pump comprises two bridge arms coupled in parallel between an input node which receives an input voltage and a reference ground, and two capacitors corresponding to the two bridge arms, each of the bridge arms having two pairs of switches coupled in series through an output node to provide an output voltage, and each of the two pairs of switches having two switches coupled in series through a common node of the corresponding bridge arm, and wherein each of the two capacitors is connected between the two common nodes of the corresponding bridge arm, the control circuit comprising:
a judging circuit, configured to provide a mode signal by comparing the output voltage of the charge pump with a first threshold voltage and a second threshold voltage via a hysteretic comparison; and
a logic circuit, configured to provide a first control signal and a second control signal based on the mode signal, wherein the first control signal and the second control signal have opposite logic states to control each of the two pairs of switches of the charge pump to work complementarily, and wherein the logic states of the first control signal and the second control signal flip in response to transiting from a first status to a second status of the mode signal, and the logic states of the first control signal and the second control signal maintain in response to transiting from the second status to the first status of the mode signal.

2. The control circuit of claim 1, wherein the control circuit keeps one of the two capacitors electrically coupled between the input node and the output node, and keeps the other one of the two capacitors electrically coupled between the output node and the reference ground.

3. The control circuit of claim 1, further comprising:
a clock pulse generating circuit, configured to provide a clock pulse signal comprising a plurality of continuous pulses based on the second status of the mode signal; wherein
the control circuit flips the logic states of the first control signal and the second control signal in response to the plurality of continuous pulses of the clock pulse signal or the transiting from the first status to the second status of the mode signal.

4. The control circuit of claim 3, wherein the logic circuit comprises:
a rising edge detection circuit, comprising an input terminal and an output terminal, wherein the input terminal of the rising edge detection circuit is configured to receive the mode signal, and the rising edge detection circuit is configured to detect rising edges of the mode signal;
an OR gate, comprising a first input terminal, a second input terminal, and an output terminal, wherein the first input terminal of the OR gate is coupled to the output terminal of the rising edge detection circuit, and the second input terminal of the OR gate is configured to receive the clock pulse signal; and
a D flip-flop, comprising an input terminal, a clock terminal, an output terminal, and an inverting output terminal, wherein the input terminal and the inverting output terminal of the D flip-flop are coupled together, the clock terminal of the D flip-flop is coupled to the output terminal of the OR gate, and the D flip-flop is configured to provide the first control signal at its output terminal, and to provide the second control signal via a first inverter.

5. The control circuit of claim 1, wherein the judging circuit comprises:
a resistor, comprising a first terminal and a second terminal, wherein the first terminal of the resistor is configured to receive a difference between one half of the input voltage and an offset voltage;
a hysteresis comparator, comprising a non-inverting input terminal, an inverting input terminal, and an output terminal, wherein the non-inverting input terminal of the hysteresis comparator is coupled to the second terminal of the resistor, the inverting input terminal of the hysteresis comparator is configured to receive the output voltage, and the output terminal of the hysteresis comparator is configured to provide the mode signal;
a current source, comprising a supply terminal and an output terminal, wherein the supply terminal of the current source is coupled to the second terminal of the resistor; and
a first switch, comprising a first terminal, a second terminal and a control terminal, wherein the first terminal of the first switch is coupled to the output terminal of the current source, the second terminal of the first switch is coupled to the reference ground, and the control terminal of the first switch is coupled to the output terminal of the hysteresis comparator via a second inverter.

6. The control circuit of claim 1, wherein:
when the output voltage decreases to be smaller than the first threshold voltage, the mode signal transits from the first status to the second status; and
when the output voltage increases to be larger than the second threshold voltage, the mode signal transits from the second status to the first status.

7. The control circuit of claim 1, wherein the control circuit is capable of controlling the charge pump to provide the output voltage having a peak value larger than half of the input voltage.

8. A charge pump, comprising:
an input node, configured to receive an input voltage;
an output node, configured to provide an output voltage;
two bridge arms, coupled in parallel between the input node and a reference ground, wherein each of the two bridge arms has two pairs of switches coupled in series through an output node, and wherein each of the two pairs of switches has two switches coupled in series through a common node of the corresponding bridge arm;
two capacitors, wherein one of the two capacitors is connected between the two common nodes of one of the two bridge arms, and the other one of the two capacitors is connected between the two common nodes of the other one of the two bridge arms; and
a control circuit, configured to provide a first control signal and a second control signal having opposite logic states to control each of the two pairs of switches of the charge pump to work complementarily, and configured to keep one of the two capacitors electrically coupled between the input node and the output node, and to keep the other one of the two capacitors electrically coupled between the output node and the reference ground.

9. The charge pump of claim 8, wherein the control circuit comprises:
a judging circuit, configured to provide a mode signal by comparing the output voltage of the charge pump with a first threshold voltage and a second threshold voltage via a hysteretic comparison; and
a logic circuit, configured to provide the first control signal and the second control signal based on the mode signal, wherein the logic states of the first control signal and the second control signal flip in response to transiting from a first status to a second status of the mode signal, and wherein the logic states of the first control signal and the second control signal maintain in response to transiting from the second status to the first status of the mode signal.

10. The charge pump of claim 9, further comprising:
a clock pulse generating circuit, configured to provide a clock pulse signal comprising a plurality of continuous pulses based on the second status of the mode signal; wherein
the control circuit flips the logic states of the first control signal and the second control signal in response to the plurality of continuous pulses of the clock pulse signal or the transiting from the first status to the second status of the mode signal.

11. The charge pump of claim 10, wherein the logic circuit comprises:
a rising edge detection circuit, comprising an input terminal and an output terminal, wherein the input terminal of the rising edge detection circuit is configured to receive the mode signal, and the rising edge detection circuit is configured to detect rising edges of the mode signal;
a first OR gate, comprising a first input terminal, a second input terminal, and an output terminal, wherein the first input terminal of the OR gate is coupled to the output terminal of the rising edge detection circuit, and the second input terminal of the first OR gate is configured to receive the clock pulse signal; and
a D flip-flop, comprising an input terminal, a clock terminal, an output terminal, and an inverting output terminal, wherein the input terminal and the inverting output terminal of the D flip-flop are coupled together, the clock terminal of the D flip-flop is coupled to the output terminal of the first OR gate, and the D flip-flop is configured to provide the first control signal at its output terminal, and to provide the second control signal via a second inverter.

12. The charge pump of claim 10, wherein the clock pulse generating circuit comprises:
a second current source, comprising a supply terminal and an output terminal;
a second switch, comprising a first terminal, a second terminal and a control terminal, wherein the first terminal of the second switch is coupled to the output terminal of the second current source, and the control terminal of the second switch is configured to receive the mode signal;
a second OR gate, comprising a first input terminal, a second input terminal, and an output terminal, wherein the first input terminal of the second OR gate is configured to receive an inverted signal of the mode signal via a third inverter, and the second input terminal of the second OR gate is configured to receive the clock pulse signal;
a third switch, comprising a first terminal, a second terminal and a control terminal, wherein the first terminal of the third switch is coupled to the second terminal of the second switch, the second terminal of the third switch is coupled to the reference ground, and the control terminal of the third switch is coupled to the output terminal of the second OR gate;
a clock capacitor, coupled between the first terminal of the third switch and the reference ground; and
a comparator, comprising a non-inverting input terminal, an inverting input terminal, and an output terminal, wherein the non-inverting input terminal of the comparator is coupled to the first terminal of the third switch, the inverting input terminal of the comparator is configured to receive a reference voltage, and the output terminal of the comparator is configured to provide the clock pulse signal via a buffer.

13. The charge pump of claim 9, wherein the judging circuit comprises:
a resistor, comprising a first terminal and a second terminal, wherein the first terminal of the resistor is configured to receive a difference between one half of an input voltage of the charge pump and an offset voltage;
a hysteresis comparator, comprising a non-inverting input terminal, an inverting input terminal, and an output terminal, wherein the non-inverting input terminal of the hysteresis comparator is coupled to the second terminal of the resistor, the inverting input terminal of the hysteresis comparator is configured to receive the output voltage of the charge pump, and the output terminal of the hysteresis comparator is configured to provide the mode signal at its output terminal;
a first current source, comprising a supply terminal and an output terminal, wherein the supply terminal of the first current source is coupled to the second terminal of the resistor; and
a first switch, comprising a first terminal, a second terminal and a control terminal, wherein the first terminal of the first switch is coupled to the output terminal of the first current source, the second terminal of the first switch is coupled to the reference ground, and the control terminal of the first switch is coupled to the output terminal of the hysteresis comparator via a first inverter.

14. The charge pump of claim 8, wherein:
when the output voltage decreases to be smaller than the first threshold voltage, the logic states of the first control signal and the second control signal flip; and
when the output voltage increases to be larger than the second threshold voltage, the logic states of the first control signal and the second control signal maintain.

15. The charge pump of claim 8, wherein the control circuit is capable of controlling the charge pump to provide the output voltage having a peak value larger than half of the input voltage.

16. A control method for a charge pump, wherein the charge pump comprises two bridge arms coupled in parallel between an input node which receives an input voltage and a reference ground, and two capacitors corresponding to the two bridge arms, each of the two bridge arms having two pairs of switches coupled in series through an output node to provide an output voltage, and each of the two pairs of switches having two switches coupled in series through a common node of the corresponding bridge arm, and wherein one of the two capacitors is connected between the two common nodes of one of the two bridge arms, and the other one of the two capacitors is connected between the two common nodes of the other one of the two bridge arms, the control method comprising:

providing a mode signal by comparing an output voltage of the charge pump with a first threshold voltage and a second threshold voltage via a hysteretic comparison;

flipping logic states of a first control signal and a second control signal in response to transiting from a first status to a second status of the mode signal, wherein the first control signal and the second control signal have opposite logic states to control each of the two pairs of switches of the charge pump to work complementarily; and maintaining the logic states of the first control signal and the second control signal in response to transiting from the second status to the first status of the mode signal.

17. The control method of claim 16, further comprising:
controlling one of the two capacitors electrically coupled between the input node and the output node, and controlling the other one of the two capacitors electrically coupled between the output node and the reference ground.

18. The control method of claim 17, further comprising:
providing a clock pulse signal comprising a plurality of continuous pulses based on the second status of the mode signal; and flipping the logic states of the first control signal and the second control signal in response to the plurality of continuous pulses of the clock pulse signal or the transiting from a first status to a second status of the mode signal.

19. The control method of claim 16, wherein:
when the output voltage decreases to be smaller than the first threshold voltage, the mode signal transits from the first status to the second status; and when the output voltage increases to be larger than the second threshold voltage, the mode signal transits from the second status to the first status.

20. The control method of claim 16, further comprising:
controlling the charge pump to provide the output voltage having a peak value larger than half of the input voltage.

* * * * *